Patented Apr. 22, 1952

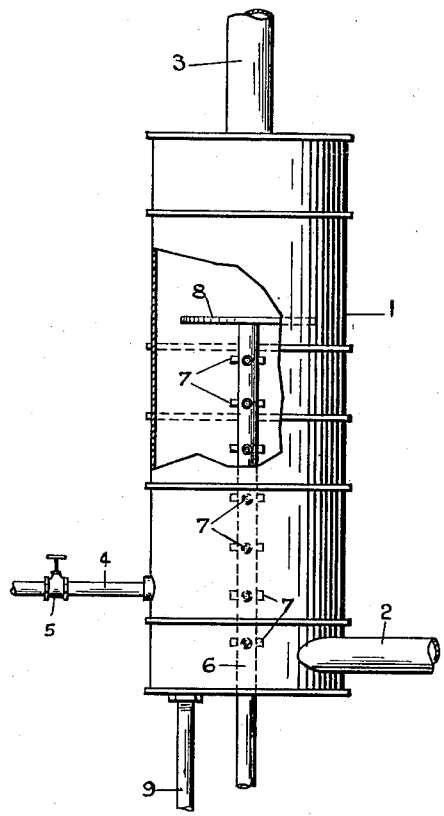

2,593,548

UNITED STATES PATENT OFFICE 2,593,548

GAS SCRUBBING DEVICE

Walter R. Edwards, Cumberland, Md., assignor to Celanese Corporation of America, a corporation of Delaware Application January 16, 1948, Serial No. 2,801

1 Claim. (Cl. 261—16)

This invention relates to an improved apparatus for the treatment of gas streams and relates more particularly to a novel gas scrubbing device.

An object of this invention is to provide an improved apparatus for the treatment of gas streams containing liquid and/or solid particles whereby said particles may be removed from the gas stream in an efficient and economical manner.

Other objects of this invention will appear from the following detailed description and the accompanying drawing.

In the drawing, wherein a preferred embodiment of my invention is shown, the figure is an elevational view of my novel device, partly broken away to show manifold arrangement.

The removal of dust, fumes, fogs and smokes from gas streams is a problem widely encountered in chemical operations. The removal of acid mists or fumes consisting of finely-divided particles of sulfuric acid or hydrochloric acid from gas streams has been found to be particularly troublesome. While suitable for many gas-washing operations, the ordinary type of packed column in which the gas stream flows countercurrent to a stream of water or other absorbent liquid has been found to be quite unsuitable for the purpose of removing sulfuric or hydrochloric acid fumes. It is essential, however, that these acid fumes be removed before the gases containing them are vented since they are not only extremely irritating to those working in the area in which said fumes are released but they are also corrosive and highly injurious to equipment in the vicinity.

I have now found that acid mists or fumes comprising finely-divided particles of sulfuric or hydrochloric acid as well as other finely-divided liquid and solid materials may be removed from gas streams by the use of the novel gas scrubbing apparatus of my invention which, as shown in the drawing, comprises an external cylindrical shell 1 provided with a gas stream feed inlet 2 through which a fume-laden or dust-laden gas may be introduced and a gas outlet 3 at the top thereof through which the gas may be removed after the dust or fumes are washed therefrom. Gas inlet 2 is tangentially disposed with respect to shell 1 so that a whirling motion will be imparted to the entering gas stream as it passes upward and the gas stream will form a helix through shell 1. A second gas inlet pipe 4 having a valve 5 is also provided for the introduction of any other gas stream that it is desired to wash or to be absorbed in said scrubber simultaneously with the treatment of the gas stream entering inlet 2. The purpose of the second gas stream is to avoid stratification in the helical stream and to enhance mixing of the two gases.

The absorption of the acid fumes or the scrubbing of any dust or other solid particles from the gas stream entering through inlets 2 and 4 is effected by means of a spray of finely-divided liquid. The means provided for introducing the liquid in the form of a spray comprises a manifold 6 provided with a plurality of spray nozzles 7 attached thereto and disposed not only circumferentially about said manifold 6 but also disposed vertically along said member.

In the usual operations the liquid introduced into manifold 6 and atomized through spray nozzles 7 comprises water, although for any specialized operation any other scrubbing liquid or absorbent may be used. The finely-divided spray coming from nozzles 7 intercepts and mingles with the helical gas stream passing upward through shell 1 and the resulting washing action effects the removal of all solid or finely-divided liquid material suspended or carried therein.

A substantial increase in the efficiency of said gas washing apparatus is achieved by providing the same with a suitably disposed baffle in the form of a disc or plate 8 placed at the top of manifold 6. The positioning of disc 8 in this manner acts to force the upwardly moving gaseous helix to pass out along the perimeter of shell 1 thus imparting sufficient angular velocity to the gas stream to cause all water droplets entrained therein to be removed in the open portion of shell 1 by the resulting centrifugal force acting on said moving gas above disc 8. The washed gas, now free of all solid and liquid materials, leaves shell 1 through outlet 3. The aqueous solution, or the slurry of solid particles formed during the gas washing operation where a dust is being removed, falls to the base of shell 1 and is removed through a discharge or drain pipe 9. Where valuable materials are contained in said solution or slurry, they may be recovered by any suitable treatment.

My novel device is highly efficient and is capable of removing over 90% or more of any solid or liquid particles carried by the gas stream passed through said scrubbing device regardless of the size of the particles. Thus, a substantially purified gas stream is obtained which may then be vented through outlet 3 without any danger to the operatives or to any plant equipment in the vicinity where the gas stream originally contained acid materials. My improved gas scrubber enables the industrial nuisance of dust laden waste gases to be eliminated and also permits of the recovery of valuable materials from gas streams.

It is to be understood that the foregoing detailed description is given merely by way of illustration and that many variations may be made therein without departing from the spirit of my invention.

Having described my invention, what I desire to secure by Letters Patent is:

In a gas scrubber adapted to be employed for the removal of liquid and solid materials from a plurality of gas streams, the combination with a cylindrical shell provided at the base with tangentially disposed gas stream inlet means adapted to cause said entering gas stream to follow a helical path and at the top with a gas discharge outlet, of radially disposed gas stream inlet means positioned above said tangentially disposed gas stream inlet means and adapted to cause a second entering gas stream to commingle with and follow the helical path of the first entering gas stream, an axially disposed manifold having a plurality of spray nozzles cooperating therewith for introducing a liquid into the shell in finely-divided form, a liquid discharge outlet and means comprising a baffle in the form of a disc integral with the top of said manifold and placed in the path of the washed gas stream in such fashion as to provide a limited and uninterrupted annular space for the passage of said gas stream whereby the movement of the same in the upper part of the shell is maintained in a helical path along the perimeter of said shell.

WALTER R. EDWARDS.

REFERENCES CITED

The following references are of record in the file of this patent:

UNITED STATES PATENTS

| Number | Name | Date |
|--------|------|------|
| 1,758,983 | Seymour | May 20, 1930 |
| 1,927,073 | Ruehl | Sept. 19, 1933 |
| 2,281,254 | Anthony | Apr. 28, 1942 |
| 2,409,088 | Weits et al. | Oct. 8, 1946 |

FOREIGN PATENTS

| Number | Country | Date |
|--------|---------|------|
| 29,255 | Norway | May 27, 1916 |